United States Patent [19]

Percec et al.

[11] Patent Number: 5,004,783

[45] Date of Patent: Apr. 2, 1991

[54] BLENDS OF HIGH NITRILE COPOLYMERS AND THERMOPLASTIC POLYMERS

[75] Inventors: Elena S. Percec, Pepper Pike, Ohio; Doreen Y. Takigawa, Los Alamos, N. Mex.

[73] Assignee: The Standard Oil Company, Cleveland, Ohio

[21] Appl. No.: 235,015

[22] Filed: Aug. 22, 1988

[51] Int. Cl.$^5$ .............. C08L 33/20; C08L 51/04; C08L 33/26; C08L 39/04

[52] U.S. Cl. .......................... 525/77; 525/64; 525/66; 525/73; 525/74; 525/75; 525/79; 525/83; 525/84; 525/188; 525/203; 525/204; 525/207; 525/211; 525/218; 525/222; 525/230

[58] Field of Search ............ 525/77, 218, 230, 73, 525/74, 75, 64, 66, 188, 203, 204, 207

[56] References Cited

U.S. PATENT DOCUMENTS

| | | | |
|---|---|---|---|
| 2,831,826 | 4/1958 | Coover et al. | 525/218 |
| 3,378,605 | 4/1968 | Baer | 525/77 |
| 3,676,526 | 7/1972 | Sommerfeld | 525/77 |
| 3,729,531 | 4/1973 | Suling et al. | 525/218 |
| 3,732,339 | 5/1973 | Suling et al. | 525/230 |
| 3,939,223 | 2/1976 | Powell et al. | 525/77 |
| 4,032,597 | 6/1977 | Yamagashi et al. | 260/876 R |
| 4,590,241 | 5/1986 | Hohlfeld | 525/204 |
| 4,914,138 | 4/1990 | Percec et al. | 525/74 |

*Primary Examiner*—Carman J. Seccuro
*Attorney, Agent, or Firm*—Larry W. Evans; Joseph G. Curatolo; Sue E. Phillips

[57] ABSTRACT

A polymer blend comprises a high nitrile copolymer and a compatible thermoplastic polymer or copolymer containing polar groups, formed from monomers selected from the group consisting of alkylacrylamides, aliphatic and cyclic methacrylates, unsaturated carboxylic acid anhydrides, vinyl pyrrolidones, heterocyclic ring compounds containing two hetero atoms, lactones and phosphorus-containing monomers that form highly crystalline polymers. Such blends can be used to form films and membranes having improved thermal, mechanical and optical properties.

9 Claims, No Drawings

BLENDS OF HIGH NITRILE COPOLYMERS AND THERMOPLASTIC POLYMERS

TECHNICAL FIELD

This invention relates to blends of high nitrile copolymers, such as acrylonitrile methyl acrylate copolymer with various thermoplastic polymers which permit the incorporation of the desirable characteristics of each component polymer or copolymer into a single material. Accordingly, improvements in thermal, mechanical and optical properties of high nitrile polymers are possible. The nitrile polymers, in turn, impart significant barrier enhancement for many thermoplastic polymers that are otherwise recognized as permeable materials. Films of these blends, which display the ability to restrict the passage of gases, vapors and organic liquids, find utility in packaging applications and as membrane materials. The polymer blends are also highly polar and are therefore, compatible in multilayer articles. Finally, the blends afford the opportunity of employing low cost materials with more costly polymers having a desired property.

BACKGROUND OF THE INVENTION

Polyacrylonitrile and acrylonitrile copolymers are among the polymers which exhibit rather limited miscibility with any other polymer. It is generally known that blends of styrene-acrylonitrile copolymers with polymethacrylates are miscible over a limited range of acrylonitrile content and that they exhibit phase separation on mixing or lower critical solution temperature behavior. Nevertheless, blends are known and in U.S. Pat. No. 4,452,943 a blend is disclosed comprising between 80 to 99 percent of a thermoplastic polymer and one to 20 percent of polyacrylonitrile or acrylonitrile-butadiene copolymer, having a nitrile group content of at least 14.7 percent. The invention relies on the nitrile polymers to provide polar domains that are responsive to electromagnetic radiation which, in turn, provide the uniform heating of thick thermoplastic articles manufactured from such mixtures to the proper thermoforming temperatures.

U.S. Pat. No. 4,540,754 discloses blends of acrylonitrile copolymers with 0.1 to 20 parts by weight of partially sulfonated polystyrene. Such blends are utilized to produce fibers that have good basic dyeability.

While these patents disclose blends of mixtures of polymers, one of which is an acrylonitrile polymer, the blends do not necessarily disclose high acrylonitrile containing copolymers. Such polymers are described in detail in U.S. Pat. Nos. 3,426,102, 3,586,737 and 3,763,278 owned by the assignee of record herein. They are basically thermoplastic polymer compositions containing at least 70 percent by weight of an unsaturated mononitrile, an ester of an olefinically unsaturated carboxylic acid and a rubbery copolymer of a conjugated diene and styrene or an olefinically unsaturated nitrile.

Blends of other thermoplastic polymers with these polymers are described in five U.S. patents also owned by the assignee of record herein. U.S. Pat. No. 3,914,337, for instance, discloses blends of high acrylonitrile copolymers with resinous copolymers of acrylonitrile and styrene. U.S. Pat. Nos. 4,153,648 and 4,195,135 disclose blends of high acrylonitrile copolymers with acrylonitrile-indene copolymers. U.S. Pat. No. 4,160,001 discloses blends of high acrylonitrile copolymers with a copolymer of methyl methacrylate and styrene. U.S. Pat. No. 4,307,207 discloses blends of high acrylonitrile copolymers with hydrophobic nylon.

The blends with nylon exhibit improved impact resistance and are useful in a variety of thermoformed articles. The other blends have improved gas barrier properties and other mechanical properties making them suitable as packaging materials.

Nevertheless, the present invention is directed toward additional thermoplastic polymer blends which comprise various polymers, that are widely recognized as permeable materials, in admixture with high acrylonitrile copolymers.

DISCLOSURE OF THE INVENTION

It is, therefore, an object of the present invention to provide miscible polymer blends comprising high acrylonitrile copolymers and various other thermoplastic polymers.

It is another object of the present invention to provide miscible polymer blends having improved thermal, mechanical and optical properties.

It is yet another object of the present invention to provide miscible polymer blends that contain low cost polymer components and which exhibit improved processability.

It is a further object of the present invention to provide miscible polymer blends which can be employed to form films and membranes that have limited or restricted permeability to gases, vapors and organic liquids.

These and other objects, together with the advantages thereof over known polymer blends, which shall become apparent from the specification which follows, are accomplished by the invention as hereinafter described and claimed.

In general, a polymer blend according to the present invention comprises a high nitrile copolymer produced by polymerizing a major proportion of a monounsaturated nitrile, a minor proportion of another monovinyl monomer copolymerizable therewith optionally in the presence of a diene rubber, and a compatible thermoplastic polymer or copolymer containing polar groups, formed from monomers selected from the group consisting of alkylacrylamides, aliphatic and cyclic methacrylates, unsaturated carboxylic acid anhydrides, vinyl pyrrolidones, heterocyclic ring compounds containing two hetero atoms, lactones and phosphorus-containing monomers that form highly crystalline polymers.

PREFERRED EMBODIMENT FOR CARRYING OUT THE INVENTION

The polymer blends of the present invention comprise a mixture of two or more polymers. One is always a high nitrile copolymer by which is meant more than about 50 percent by weight of the copolymer is a nitrile polymer. The other is a member of a specific class of thermoplastic polymers which will be discussed hereinbelow.

More particularly, the nitrile copolymers useful in this invention are those produced by polymerizing a major proportion of a monounsaturated nitrile, e.g., acrylonitrile, and a minor proportion of another monovinyl monomer component copolymerizable therewith, optionally in the presence of a diene rubber which may be a homopolymer or copolymer of a conjugated diene monomer.

The high nitrile copolymer compositions of the present invention can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The olefinically unsaturated nitriles used in the present invention are the alpha, beta-olefinically unsaturated mononitriles having the structure:

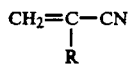

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

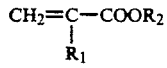

wherein $R_1$ is hydrogen, an alkyl group having from 1 to 6 carbon atoms, or a halogen, and $R_2$ is an alkyl group having from 1 to 30 carbon atoms. Compounds of this type include methyl acrylate, ethyl acrylate, the propylacrylates, the butyl acrylates, and amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

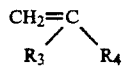

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, 2,4,4-trimethyl pentene-1, and the like and mixtures thereof. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrate and the like. Most preferred is vinyl acetate. The vinyl aromatic monomers include styrene, alpha-methyl styrene, the vinyl toluenes, the vinyl xylenes, indene and the like. Most preferred is styrene.

The olefinic nitrile copolymer is optionally polymerized in the presence of a preformed diene rubber which may be a homopolymer or copolymer of a conjugated diene monomer. These monomers include 1,3-butadiene, isoprene, chloroprene, bromoprene, cyanoprene, 2,3-dimethyl 1,3-butadiene, 2-ethyl 1,3-butadiene, 2,3-diethyl 1,3-butadiene and the like. Most preferred for the purpose of this invention are 1,3-butadiene and isoprene because of their ready availability and their excellent polymerization properties.

The conjugated diene monomer may be copolymerized with a comonomer selected from the group consisting of vinyl aromatic monomer, an olefinic nitrile monomer having the structure:

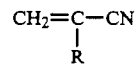

wherein R has the foregoing designation, and an ester having the structure:

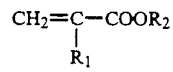

wherein $R_1$ and $R_2$ have the foregoing designations. The rubbery polymer contains from 50 percent to 100 percent by weight of polymerized conjugated diene monomer and from 0 percent to 50 percent by weight of a comonomer.

Preferred polymers useful in this invention are those prepared by the polymerization of 100 parts by weight of (A) from 60 percent to 90 percent by weight of at least one nitrile having the structure:

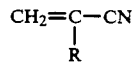

wherein R has the foregoing designation and (B) from 10 percent to 40 percent by weight based on the combined weights of (A) and (B) of at least one member selected from the group consisting of an ester having the structure:

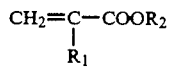

wherein $R_1$ and $R_2$ have the foregoing respective designations; and alpha-olefins having the structure:

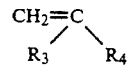

wherein $R_3$ and $R_4$ have the foregoing respective designations; a vinyl ether selected from the group consisting of methyl vinyl ether, ethyl vinyl ethers, the propyl vinyl ethers, and the butyl vinyl ethers; vinyl acetate; styrene and indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

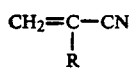

wherein R has the foregoing designation, and an ester having the structure:

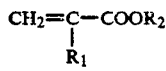

wherein $R_1$ and $R_2$ have the foregoing respective designations, said rubbery polymer containing from 50 percent to 100 percent by weight of polymerized conjugated diene and from 0 percent to 50 percent by weight of a comonomer.

The most preferred nitrile copolymers are prepared by the polymerization of between 70 and 80 parts by weight of (A) and 20 to 30 parts by weight of (B) in the presence of from 5 to 15 parts by weight of (C).

Thermoplastic high nitrile resins of at least 70 percent by weight of a monounsaturated nitrile and up to 30 percent by weight of at least one other comonomer and which may also be rubber modified have previously been described in U.S. Pat. Nos. 3,426,102, 3,586,737, 3,763,278, the subject matter of which is incorporated herein by reference. These copolymers have excellent barrier properties and can be molded into containers, pipes, films, sheets and the like, to be used for packaging solids, liquids and gases of various types.

The thermoplastic polymers that can be blended with high nitrile polymers according to the present invention are those which contain certain polar groups. These polymers include various homopolymer copolymers and graft copolymers and are formed from a variety of monomers. One such group comprises the alkylacrylamides which form polymers such as poly(N,N-dimethylacrylamide) or PNNDA. Another group includes the aliphatic and cyclic methacrylates which form polymers such as poly(methyl methacrylate) or PMMA, and poly(t-butyl methacrylate) or Pt-BuM, as well as poly(cyclohexyl methacrylate) or PCHM and poly(isobornyl methacrylate) or Pi-BoM, respectively, and the like.

Another group includes the unsaturated carboxylic acid anhydrides, e.g., maleic anhydride, which form polymers such as poly(maleic anhydride) or PMA. Copolymers with a monovinyl aromatic such as styrene include poly(styrene-comaleic anhydride) or SMA. Another group includes the vinyl pyrrolidones which form poly(vinyl pyrrolidone) or PVP. Another group includes heterocyclic ring compounds containing two hetero atoms such as the monomer oxazoline which forms poly(2-ethyl oxazoline) or PEOX. Yet another group includes the lactones to form polymers such as poly(ε-caprolactone) or PCL. Also included are phosphorus-containing monomers such as 2-chloro-1,3,2-dioxaphospholane to form highly crystalline polymers such as polyphosphonates.

The miscibility of the polymer components present in the blend can be attributed to the interactions therebetween such as hydrogen bonding. At higher mixing temperatures, however, the effect of favorable interaction is reduced eventually leading to phase separation above the lower critical solution temperature. Several potential sites for interactions between the acrylonitrile copolymer and the thermoplastic polymers are summarized in Table I. Weak hydrogen bondings can be assumed to occur when the nitrile copolymer is reacted with some of the polymers presented in Table I. The nitrogen atom, which contains a lone pair of electrons, is an excellent site for potential hydrogen bonding to a labile proton. Additionally, hydrogen bonding interactions are possible between the carbonyl group of one polymer component and a hydrogen alpha to a carbonyl or a nitrile moiety of another polymer.

TABLE 1

| No. | Polymer | Structure and Reactive Sites |
|---|---|---|
| 1 | B-200[a] | $C\equiv N$ <br> $+CH_2-CH)_m(CH_2-CH)_n$ <br> $\quad\quad\quad\quad\quad\quad\quad\quad COOCH_3$ |
| 2 | PNNDA | $+CH_2-CH)_n$ <br> $\quad\quad C=O$ <br> $\quad CH_3-N-CH_3$ |
| 3 | PMA | $+CH-CH)_n$ <br> $O=C\quad C=O$ <br> $\quad\backslash O/$ |
| 4 | PEOX | $+N-CH_2-CH_2)_n$ <br> $\quad C=O$ <br> $\quad CH_2-CH_3$ |
| 5 | PCL | $+(CH_2)_5-\overset{O}{\overset{\|}{C}}-O)_n$ |
| 6 | PVP | $+CH_2-CH)_n$ <br> (N-pyrrolidone ring) |
| 7 | SMA | $+CH_2-CH-CH-CH)_n$ <br> (phenyl) $\quad O=C\quad C=O$ <br> $\quad\quad\quad\quad\backslash O/$ |

[a] high nitrile copolymer as described hereinabove, having a number average molecular weight of 50,000.

The value of n for the foregoing thermoplastic polymers is whatever number that is necessary to provide a number average molecular weight range of from about 10,000 to 50,000. The polymer blend composition of the present invention comprises broadly, from about 1 to 99 weight percent of the high acrylonitrile copolymer and from about 99 to 1 weight percent of the additive thermoplastic copolymer, with ranges of from about 60 to 95 weight percent and 40 to 5 weight percent, respectively, being preferred.

The polymer blends of the present invention are prepared by forming solutions of the two components in a mutual solvent such as dimethylformamide (DMF), N,N-dimethylacetamide (DMAC) and the like. Mixing occurs at ambient pressure and temperature for a time of from about 1 to 5 hours. Polymer blend films can be subsequently formed by casting, evaporation of the solvent and drying, as is known in the art.

In order to demonstrate practice of the present invention, several blends of the high acrylonitrile copolymer B-200, synthesized in the laboratory, and the six additive polymers from Table I were prepared. Miscibility was determined based on the existence of a single glass transition temperature. The composition of B-200 was 75 parts by weight of acrylonitrile and 25 parts by weight of methyl acrylate.

More particularly, the polymers PNNDA, PMA, PVP and PEOX, obtained from Polysciences, Inc., and SMA and PCL, obtained from Aldrich Chemical Co. were used as received. Blends were formed by dissolving 5 grams of the high acrylonitrile copolymer in DMF followed by the addition of the other polymer in varying amounts to obtain the desired ratios, e.g., 90/10, 80/20, 70/30 and so on. The mixing was continued for about 1 to 2 hours.

The films of the blends prepared for thermal analysis measurements were cast from DMF on glass plates heated at 80° C. After the majority of the solvent was evaporated, the films were transferred to an oven and heated to 80° C. under vacuum for 6 to 10 days. The complete removal of residual DMF which could act as an efficient plasticizer was very difficult. Therefore, before performing any measurements, the films were analyzed by IR spectroscopy. Only the films found to be free of solvent were further considered for thermal analysis. The calorimetric studies were conducted on a Perkin Elmer differential scanning calorimeter (DSC-4) coupled to a computerized data station. A heating rate of 20° C. per minute was employed in all experiments and the glass transition temperature was taken as the onset of the heat capacity change.

Glass transition temperatures (Tg) for each of the blends are reported in Tables II-VII hereinbelow. In each Table, Tg is also presented for the acrylonitrile copolymer, B-200, and for the polymer blend partner as controls. The blends, in terms of various weight fractions e.g., 95/5, B-200/PNNDA or the like, appear between the first and last entry in each Table.

POLY(N,N-DIMETHYLACRYLAMIDE)

The composition range evaluated for this system and the Tg values measured are presented in Table II. Miscibility was observed over the entire range of compositions. This was proved by the formation of transparent films and the existence of a single glass transition temperature.

TABLE II

| Glass Transition Temperatures of B-200/PNNDA Blends | | | |
|---|---|---|---|
| Ex. No. | B-200/PNNDA | Tg (°C.) | Observations |
| 1 | 100/0 | 81.99 | Optically Clear Film |
| 2 | 95/5 | 82.32 | Optically Clear Film |
| 3 | 90/10 | 82.91 | Optically Clear Film |
| 4 | 80/20 | 83.99 | Optically Clear Film |
| 5 | 75/25 | 84.20 | Optically Clear Film |
| 6 | 50/50 | 84.63 | Optically Clear Film |
| 7 | 40/60 | 85.16 | Optically Clear Film |

TABLE II-continued

| Glass Transition Temperatures of B-200/PNNDA Blends | | | |
|---|---|---|---|
| Ex. No. | B-200/PNNDA | Tg (°C.) | Observations |
| 8 | 20/80 | 87.58 | Optically Clear Film |
| 9 | 0/100 | 97.55 | Optically Clear Film |

POLY(MALEIC ANHYDRIDE)

The composition range evaluated for this system and the Tg values measured are presented in Table III. The two polymers were miscible in all proportions. This was proved by the formation of transparent films and the existence of a single glass transition temperature.

TABLE III

| Glass Transition Temperatures of B-200/PMA System | | | |
|---|---|---|---|
| Ex. No. | B-200/PMA | Tg (°C.) | Observations |
| 1 | 100/0 | 81.99 | Optically Clear Film |
| 10 | 95/5 | 81.30 | Optically Clear Film |
| 11 | 90/10 | 74.63 | Optically Clear Film |
| 12 | 80/20 | 73.40 | Optically Clear Film |
| 13 | 75/25 | 71.02 | Optically Clear Film |
| 14 | 50/50 | 70.30 | Optically Clear Film |
| 15 | 25/75 | 69.90 | Optically Clear Film |
| 16 | 0/100 | 69.15 | Optically Clear Film |

POLY(VINYL PYRROLIDONE)

The composition range evaluated for this system and the Tg values measured are presented in Table IV. The two polymers were miscible in all proportions. This was proved by the formation of transparent films and the existence of a single glass transition temperature.

TABLE IV

| Glass Transition Temperatures of B-200/PVP System | | | |
|---|---|---|---|
| Ex. No. | B-200/PVP | Tg (°C.) | Observations |
| 1 | 100/0 | 81.99 | Optically Clear Film |
| 17 | 95/5 | 81.80 | Optically Clear Film |
| 18 | 90/10 | 81.51 | Optically Clear Film |
| 19 | 80/20 | 81.30 | Optically Clear Film |
| 20 | 75/25 | 81.10 | Optically Clear Film |
| 21 | 40/60 | 79.20 | Optically Clear Film |
| 22 | 25/75 | 78.00 | Optically Clear Film |
| 23 | 0/100 | 76.50 | Optically Clear Film |

POLY(2-ETHYL OXAZOLINE)

The composition range evaluated for this system and the Tg values measured are presented in Table V. The two polymers were not miscible in all proportions but only in a limited compositional range. Beyond 20 percent of PEOX, they were immiscible and separated into two distinct phases. The solution cast films were cloudy at room temperature and exhibited two glass transition temperatures occurring at essentially the same temperature as for the pure components.

TABLE V

| Glass Transition Temperatures of B-200/PEOX System | | | | |
|---|---|---|---|---|
| Ex. No. | B-200/PEOX | $Tg_1$ (°C.) | $Tg_2$ (°C.) | Observations |
| 1 | 100/0 | 81.99 | — | Optically Clear Film |
| 24 | 95/5 | 81.84 | — | Optically Clear Film |
| 25 | 90/10 | 80.30 | — | Optically Clear Film |
| 26 | 80/20 | 81.90 | 57.0 | Cloudy Film |
| 27 | 75/25 | 81.83 | 56.7 | Cloudy Film |
| 28 | 50/50 | 81.90 | 56.9 | Cloudy Film |
| 29 | 0/100 | 56.62 | — | Optically Clear Film |

POLY(ε-CAPROLACTONE)

The composition range evaluated for this system and the Tg values measured are presented in Table VI. The two polymers were not miscible in all proportions but only in a limited compositional range. Beyond 10 percent of PCL, the blends formed cloudy solutions. Their cast films were opaque, indicating their heterogeneous nature and the limited miscibility was confirmed by DSC measurements.

TABLE VI

Glass Transition Temperatures and Melting Behavior of B-200/PCL System

| Ex. No. | B-200/ PCL | Tg (°C.) | Tm (°C.) First Heat | Tm (°C.) Second Heat | Observations |
|---|---|---|---|---|---|
| 1 | 100/0 | 81.99 | — | — | Optically Clear Film |
| 30 | 98/2 | 81.00 | — | — | Optically Clear Film |
| 31 | 96/4 | 80.20 | — | — | Optically Clear Film |
| 32 | 95/5 | 79.40 | 56.04 | — | Cloudy Film |
| 33 | 90/10 | 81.90 | 56.29 | 56.68 | Cloudy Film |
| 34 | 75/25 | 67.73 | 59.75 | 55.38 | Cloudy Film |
| 35 | 50/50 | 76.41 | 62.00 | 60.22 | Cloudy Film |
| 36 | 0/100 | — | 58.88 | 61.38 | Cloudy Film |

POLY(STYRENE-CO-MALEIC ANHYDRIDE)

The composition range evaluated for this system and the Tg values measured are presented in Table VII. The two polymers were not miscible in all proportions but only in a limited compositional range. These blends showed single glass transitions at temperatures intermediate between those of the parent polymers where the second polymer, SMA, did not exceed 15 percent.

TABLE VII

Glass Transition Temperatures of B-200/SMA System

| Ex. No. | B-200/SMA | $Tg_1$ (°C.) | $Tg_2$ (°C.) | Observations |
|---|---|---|---|---|
| 1 | 100/0 | 81.99 | — | Optically Clear Film |
| 37 | 95/5 | 82.30 | — | Optically Clear Film |
| 38 | 90/10 | 83.70 | — | Optically Clear Film |
| 39 | 85/15 | 84.90 | — | Optically Clear Film |
| 40 | 50/50 | 81.99 | 133.00 | Cloudy Film |
| 41 | 20/80 | 81.99 | 133.00 | Cloudy Film |
| 42 | 0/100 | 133.00 | — | Optically Clear Film |

In conclusion, the blends comprising a high acrylonitrile copolymer with poly(N,N-dimethylacrylamide) or poly(maleic anhydride) or poly(vinyl pyrrolidone) were miscible over their entire range of composition. The blends comprising a high acrylonitrile copolymer with poly(2-ethyl oxazoline) or poly(ε-caprolactone) and poly(styrene-co-maleic anhydride) exhibited limited miscibility.

It should be clear from the foregoing examples and specification disclosure that the polymer blends of the present invention exhibit improved thermal and optical properties as compared to the separate properties of the additive thermoplastic polymers and the high nitrile copolymers in the unblended state. Films prepared from these polymer blends especially compositions containing a high content of acrylonitrile component display the ability to restrict the passage of gases, vapors and organic liquids and, therefore, have importance in the food packaging industry and related applications. By blending, it is possible to incorporate lower cost polymers with more expensive barrier resins or to improve certain properties of the barrier resins by the addition of a compatible thermoplastic polymer having the desired property.

It is to be understood that the use of thermoplastic polymers having polar domains is not limited to the five polymers and copolymer exemplified herein or by the disclosure of typical thermoplastic polymers provided herein, the examples having been provided merely to demonstrate practice of the subject invention. Similarly, practice of the present invention should not be limited to the specific high nitrile copolymer exemplified herein. Those skilled in the art may readily select other thermoplastic polymers and copolymers and high nitrile copolymers according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A polymer blend comprising:
a high nitrile copolymer prepared by the polymerization of 100 parts by weight of (A) from 60 percent to 90 percent by weight of at least one nitrile having the structure

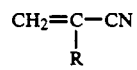

wherein R is hydrogen, a lower alkyl group having from 1 to 4 carbon atoms, or a halogen, and (B) from 10 percent to 40 percent by weight based on the combined weights of (A) and (B) of at least one member selected from the group consisting of (1) an ester having the structure

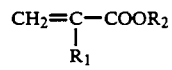

wherein $R_1$ is hydrogen, an alkyl group having from 1 to 6 carbon atoms, or a halogen, and $R_2$ is an alkyl group having from 1 to 30 carbon atoms, (2) an alpha-olefin having the structure

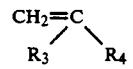

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure

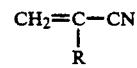

wherein R has the foregoing designation, and an ester having the structure

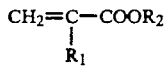

wherein $R_1$ and $R_2$ have the foregoing respective designations, said rubbery polymer containing from 50 percent to 100 percent by weight of polymerized conjugated diene and from 0 percent to 50 percent by weight of comonomer; and a compatible thermoplastic homopolymer or copolymer containing polar groups, consisting of the polymerization product formed from monomers selected from the group consisting of alkylacrylamides, unsaturated carboxylic acid anhydrides, vinyl pyrrolidones, heterocyclic ring compounds containing two hetero atoms, lactones and phosphorus-containing monomers that form highly crystalline polymers.

2. A polymer blend, as set forth in claim 1, wherein said high nitrile copolymer comprises acrylonitrile and methyl acrylate.

3. A polymer blend, as set forth in claim 2, comprising from about 1 to 99 parts by weight of said high acrylonitrile copolymer and from about 99 to 1 parts by weight of poly(N,N-dimethylacrylamide) as said thermoplastic polymer.

4. A polymer blend, as set forth in claim 2, comprising from about 1 to 99 parts by weight of said high acrylonitrile copolymer and from about 99 to 1 parts by weight of poly(maleic anhydride) as said thermoplastic polymer.

5. A polymer blend, as set forth in claim 2, comprising from about 1 to 99 parts by weight of said high acrylonitrile copolymer and from about 99 to 1 parts by weight of poly(vinyl pyrrolidone) as said thermoplastic polymer.

6. A polymer blend, as set forth in claim 2, comprising from about 1 to 85 parts by weight of said high acrylonitrile copolymer and from about 99 to 15 parts by weight of poly(2-ethyl oxazoline) as said thermoplastic polymer.

7. A polymer blend, as set forth in claim 6, comprising from about 80 to 90 parts by weight of high acrylonitrile copolymer and from about 20 to 10 parts by weight of poly(2-ethyloxazoline) as said thermoplastic polymer.

8. A polymer blend, as set forth in claim 2, comprising from about 95 to 99 parts by weight of said high acrylonitrile copolymer and from about 1 to 5 parts by weight of poly(ε-caprolactone) as said thermoplastic polymer.

9. A polymer blend comprising:
from about 1 to 99 parts by weight of a high nitrile copolymer comprising acrylonitrile and methyl acrylate; and
from about 99 to 1 parts by weight of poly(N,N-dimethylacrylamide).

* * * * *